May 23, 1961 W. P. HORNE 2,985,137
CHICKEN BROODER
Filed Sept. 9, 1958 2 Sheets-Sheet 2
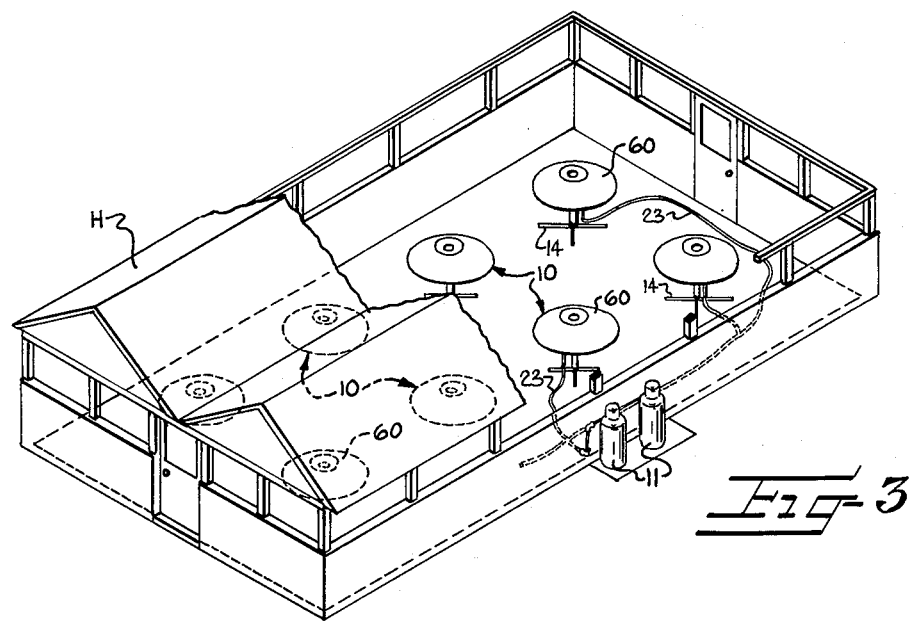
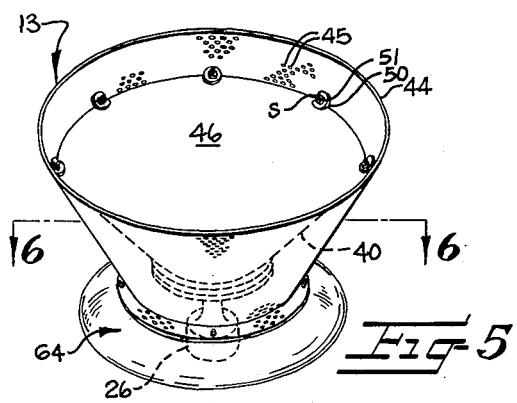
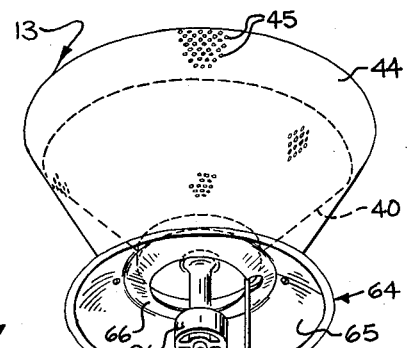
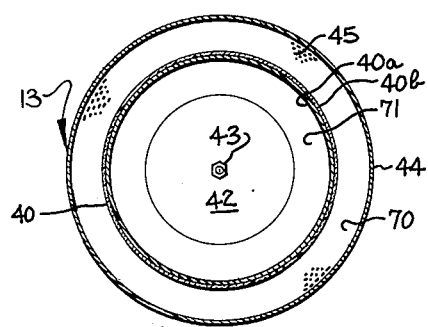
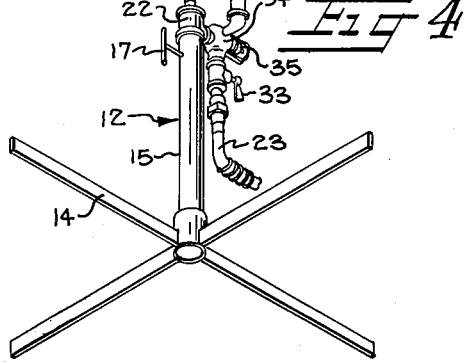

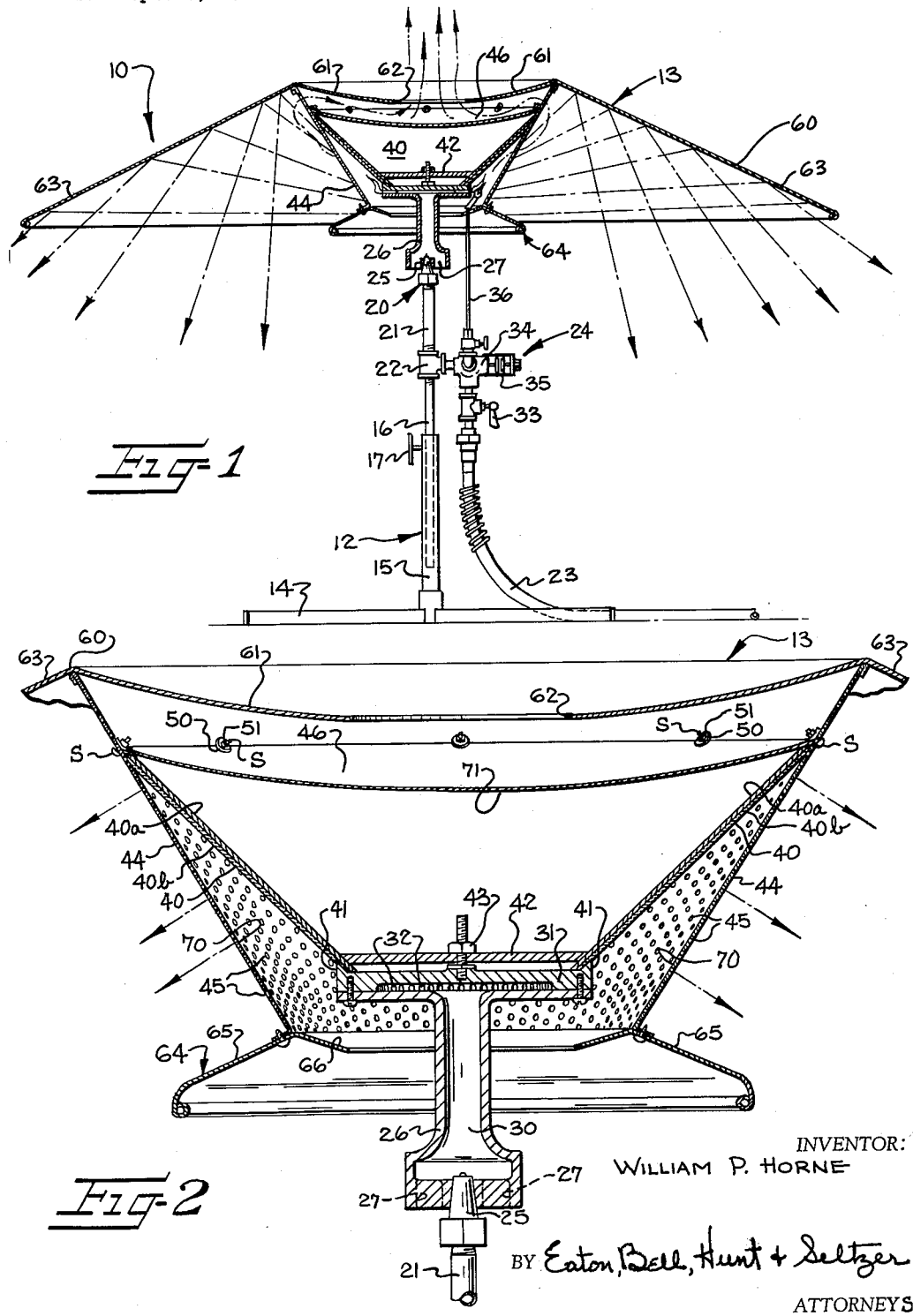

United States Patent Office

2,985,137
Patented May 23, 1961

2,985,137

CHICKEN BROODER

William P. Horne, Charlotte, N.C., assignor to Bright Leaf Industries, Inc., Charlotte, N.C., a corporation of North Carolina Filed Sept. 9, 1958, Ser. No. 759,977

8 Claims. (Cl. 119—32)

This invention relates to chicken brooders, and more particularly to a gas-fired brooder which utilizes radiant heat in the infra-red range for increasing the efficiency of the brooder.

Many problems confront persons engaged in the poultry business in connection with providing a chicken brooder which supplies adequate heat to the chicks. Providing the chicks with sufficient heat to keep them warm becomes an especially serious problem during the winter months.

Where the brooder provides areas of unequal heat, the chicks invariably attempt to crowd into the most comfortable area. The crowding of the chicks which results because of this unequal heat distribution by the brooder is likely to increase the rate of chick mortality. In a particular brood of chicks, there are always some chicks which are weaker than the others. The weaker chicks are at a distinct disadvantage when crowded conditions prevail because they are unable to reach food or water, being pressed aside by the stronger chicks. Under such conditions, an increase in the rate of chick mortality is to be expected.

Often, the heat from the chicken brooder, although it may be sufficient to warm the chicks, does not prevent the formation of a damp condition in the litter on the brooder floor due to chick excretions therein. Unless dampness in the brooder floor litter is substantially prevented, the development of mold is encouraged. The litter then becomes a breeding ground for disease-carrying bacteria or germs and the constant picking of the chicks at the litter can rapidly distribute the disease-carrying germs through the brood.

Other chicken brooders are unable to distribute heat evenly throughout a relatively large area and are therefore constructed to substantially enclose an area which they are capable of heating sufficiently to provide minimum warmth for the chicks. In this instance, the chicks cluster beneath the brooder whereby a majority of them are hidden from view. Under the best possible conditions, there is always some chick motality. Chicken brooders which substantially enclose the heated area thereby prevent a quick observation of dead chicks by hiding them from view. Dead chicks if allowed to remain amidst the brood can quickly bring about diseased conditions.

Moreover, in brooders of the latter "enclosure" type where a fuel burner provides the originating source of heat, the air intake of the fuel burner which is necessary for the combustion of the fuel creates a cool drafty condition across the floor of the chicken house. The chicks standing on the floor are thus directly exposed to such air drafts, making them strongly susceptible to sickness as a result thereof.

The proper heating of the chicks by a chicken brooder indirectly results in a greater profit margin to a person in the poultry raising business. When the chicks are heated properly, they will not have to burn excess energy from the food they eat to supply themselves with additional heat and will accordingly grow and gain weight faster because a substantial amount of the food they eat will result in a weight or meat gain rather than being burned up to supply additional heat energy.

It is a primary object of this invention to provide a chicken brooder in which the products of combustion supplied by a gas burner are converted into radiant heat in the infra-red range which is distributed evenly on the backs of the chicks. It has been determined that infra-red heat from a chicken brooder is especially desirable because it promotes better feathering of the chicks, provides an even distribution of warmth, and maintains the litter in a substantially dry condition.

It is another object of this invention to provide a chicken brooder in which the products of combustion supplied from a gas burner are trapped and forced through the perforations in an inverted frusto-conical screen to produce a red glow on the screen, whereby the screen serves as a source of radiant infra-red heat directed downwardly on the chicks.

It is another object of this invention to provide a chicken brooder comprising an upright standard supporting a gas burner and a burner-surrounding radiant heater element in an elevated position over the chicks on the floor below, wherein the radiant heater element is effective to convert the products of combustion supplied by the gas burner into radiant heat in the infra-red range for distribution on the backs of the chicks and the elevated position of the gas burner causes any air drafts created by the air intake of the burner to be raised well above the floor of the chicken house on which the chicks stand to prevent their exposure to these air drafts, thereby substantially reducing chick sickness because of drafty conditions while allowing desirable ventilation.

It is another more specific object of this invention to provide an improved chicken brooder utilizing a gas burner for supplying hot products of combustion in which the products of combustion are trapped between telescoped inner and outer inverted frusto-conical members to promote complete combustion of the gases, the outer member being a perforated screen through which the hot gases pass to produce a red glow thereon. The perforated screen thereby serves as a source of radiant infra-red heat and because of its inverted frusto-conical shape directs a major portion of this radiant heat downwardly upon the backs of the chicks, any stray radiation being reflected downwardly by an overlying canopy having reflector surfaces thereon.

Some of the objects of the invention having been stated, other objects will appear as the description proceeds, when taken in connection with the accompanying drawings, in which—

Figure 1 is a vertical sectional view, partially in elevation, of the improved chicken brooder unit embodying the present invention;

Figure 2 is an enlarged fragmentary vertical sectional view of the upper portion of the chicken brooder unit revolved 90° from the position shown in Figure 1;

Figure 3 is a perspective view of a chicken house, partially broken away to show a plurality of chicken brooder units installed therein;

Figure 4 is a perspective view of the improved chicken brooder unit with the roof or canopy removed;

Figure 5 is a perspective view of the housing assembly for the chicken brooder unit; and Figure 6 is a transverse sectional view of the housing assembly for the chicken brooder unit taken along line 6—6 in Figure 5.

Referring to the drawings more specifically, the chicken brooder unit 10 shown in Figures 1 and 4 is adapted to be installed in a chicken house H, a plurality of such units being placed therein, as shown in Figure 3. Each of the chicken brooder units 10 is supplied with a gaseous fuel through a suitable system of conduits communicating with a source 11 of natural or liquid gas.

The chicken brooder unit 10 comprises an upright standard 12 and an upper housing or superstructure 13 supported by the standard. The chicken brooder unit 10 is supported on the floor of the chicken house H by a base 14 secured to the lower end of the standard 12. The base 14 may take any suitable form, but for purposes of illustration is shown in Figure 4 as comprising a plurality of legs extending radially outwardly from a central hub which telescopically receives the lower end of the standard 12.

The standard 12 is constructed for vertical adjustment to raise and lower the housing 13 of the brooder unit 10 relative to the floor of the chicken house H, as desired. To provide this vertical adjustment, the standard 12 is made of two-piece construction, there being a lower tubular socket member 15 adapted to telescopically receive an upper solid rod member 16. Thus, it will be apparent that the standard 12 may be adjusted as to height by raising or lowering the rod member 16 with respect to the tubular socket member 15 in which it is received. A set screw 17 extends through the wall of the tubular socket member 15, as shown best in Figure 1, and may be tightened to rigidly secure the rod member 16 therewithin at a selected position.

A gas burner 20 is mounted atop the upright standard 12, being connected to the upper end of the rod member 16 as presently described. The gas burner 20 is provided with a branch supply pipe 21 secured to the upper end of the rod member 16 by a T-coupling 22 which also connects a main supply conduit 23 to the branch pipe 21, there being means 24 in the main supply conduit 23 for controlling the flow of gaseous fuel therethrough.

The upper end of the branch supply pipe 21 has a tapered nozzle 25 thereon which is adapted to be received in a complementary tapered aperture formed in the bottom wall of the burner housing 26 for the gas burner 20. The bottom wall of the burner housing 26 also includes a plurality of apertures 27 (shown in dotted lines in Figure 2) for admitting air into a chamber 30 where it is mixed with the gas entering the chamber 30 in the burner housing 26 through the tapered nozzle 25 of the branch supply pipe 21. The top of the burner housing 26 is closed by a circular or disc-like burner head 31 which is suitably secured thereto. The circular burner head 31 is provided with a plurality of circumferentially arranged radially outwardly extending burner nozzles 32 communicating with the mixing chamber 30 in the burner housing 26.

The introduction of gas into the burner housing 26 through the branch supply pipe 21 together with the admission of air through the apertures 27 in the bottom wall of the burner housing 26 results in the mixing of these components in the chamber 30 from where the gaseous mixture is led through the circumferentially arranged burner nozzles 32 in the burner head 31 to be ignited as it issues from the burner nozzles 32 for a purpose to be subsequently described.

The gas is supplied to the branch pipe 21 through the main supply conduit 23 coupled thereto by the T-coupling 22. The means 24 in the main supply conduit 23 for regulating the supply of gas to the burner 20 includes a manually operable valve 33. The valve 33 is normally in open position to permit the flow of gas through the main supply conduit 23 into the branch pipe 21. When it is desired to shut off the supply of gas to the gas burner 20 completely, valve 33 is closed to block the main supply conduit 23 and prevent the delivery of gas therethrough. The regulating means 24 also includes heat-responsive means in the form of a valve 34 controlled by a thermostat 35 installed in the main supply conduit 23, the valve 34 being regulated by the thermostat 35 to control the amount of gas delivered to the burner 20 for regulating the quantity of heat produced therefrom. A pilot conduit 36 is coupled to the main supply conduit 23 and has a manually operable valve 38 installed therein to control the passage of gas to the pilot 36. Although it is not shown in the drawings, a safety shut-off valve may be provided in the main supply conduit 23, wherein the safety shut-off valve is wired to a thermocouple adjacent the pilot flame. Should the flame from the pilot 36 be extinguished, the lack of heat on the thermocouple adjacent thereto would cause the safety valve in the main supply conduit 23 to automatically close, thereby preventing the escape of unignited gas from the burner 20 and pilot 36.

As heretofore described, the entire gas burner assembly 20 is mounted atop the upright standard 12 and cooperates therewith to support the superstructure or housing 13 of the brooder unit 10. In this connection, the brooder superstructure 13 includes an inverted frusto-conical baffle member or shield 40 removably secured to the top of the burner head 31. The baffle member 40 is preferably of two-piece construction, comprising an inner metallic layer 40a and an outer layer 40b of insulation material. As shown in Figure 2, the top surface of burner head 31 may be provided with an upwardly extending annular rib 41 about its periphery, the annular rib 41 having a tapered inner surface complementary to the frusto-conical baffle member 40. A wedge plate 42 having a beveled periphery complementary to the internal surface of the frusto-conical baffle member 40 is positioned within the baffle member 40 to sandwich the baffle member 40 between the beveled periphery of the wedge plate 42 and the tapered inner surface of the annular rib 41 projecting upwardly from the burner head 31. The baffle member 40 is releasably clamped in position atop the burner head 31 between the wedge plate 42 and the annular rib 41 by suitable means, such as the nut and bolt arrangement 43 shown.

A radiant heater element or screen 44 provided with a plurality of perforations 45 therein evenly distributed over its entire surface surrounds the gas burner 20 and the baffle member 40 attached to the top of the burner head 31. Like the baffle member 40, the screen 44 is also in the form of an inverted frusto-conical member. The baffle member 40 supports the perforated screen 44 in surrounding relation to the gas burner 20, the two inverted frusto-conical members 40, 44 being reinforced against inward collapse by a circular concave lid or cover 46 closing the open upper end of baffle member 40. The baffle member 40, the perforated screen 44, and the cover 46 are rigidly secured together by suitable means, such as screws S having washers 50 and lock nuts 51 thereon. Thus, it can be appreciated that the concave cover 46 may be readily removed from the upper end of the baffle member 40 to permit the disassembly of the screen 44 from the baffle member 40 and the baffle member 40 from the top of the burner head 31 by loosening the screws S and removing them. It will be observed that the perforated screen 44 extends above its juncture with the baffle member 40 and cover 46 for a purpose to be described hereafter.

The superstructure 13 of the brooder unit 10 includes a generally circular roof or canopy 60 resting on the upper end edge of the perforated screen 44 in vertically spaced relation to the cover 46 for the baffle member 40. The roof or canopy 60 comprises a central concave portion 61 substantially parallel to the concave cover 46 and provided with a vent opening 62 in its center. The canopy 60 further includes an outer downwardly extending conical portion 63 integral with the central concave portion 61. The lower surface of the outer conical portion 63 of the canopy 60 is brightly polished to serve as a reflecting means for stray radiant heat in a manner to be presently described.

An annular collar 64 is secured to the lower end edge of the perforated screen 44, the annular collar 64 including a downwardly directed conical portion 65 substantially parallel to the outer conical portion 63 of the canopy 60 and a flange portion 66 extending generally radially inwardly of the perforated screen 44.

Thus, it will be seen that the inverted frusto-conical members 40, 44 cooperate to define an annular pocket 70 of generally triangular cross-section adapted to trap the products of combustion of the gases issuing from the nozzles 32 of the gas burner 20. The air within the annular pocket 70 becomes heated to a high degree, the annular pocket 70 promoting complete combustion of the gaseous mixture from the gas burner 20.

The trapping of these hot products in the annular pocket 70 results in hot gases being forced through the perforations 45 in the screen 44, whereupon the screen 44 becomes heated to the extent that a red glow is produced thereon. The screen 44 is provided with a sufficient number of perforations 45 therein, whereby approximately 20% of the total surface area of the screen is open which permits the "squeezing" of the hot gases through the perforations therein for producing the red glow thereon. Thus, the perforated screen 44 serves as a source of radiant heat in the infra-red range, while the inverted frusto-conical shape of the screen 44 causes a major portion of the radiant heat emanating therefrom to be directed downwardly in a wide circular band on the backs of the chicks standing on the floor of the chicken house H below.

The primary heat supplied by the chicken brooder unit 10 is therefore derived from the perforated screen 44 when it has been heated sufficiently to produce a red glow thereon. A certain amount of stray radiation from the screen 44 is unavoidable, this stray radiation being reflected downwardly upon the backs of the chicks to enhance the heat supplied by the radiant screen 44 by the brightly polished lower reflecting surface of the outer conical portion 63 of canopy 60.

The heated products of combustion after passing outwardly through the perforations 45 in screen 44 below its juncture with the baffle member 40 are returned through the perforations 45 in screen 44 located above the baffle member 40 to insure that the upper portion of screen 44 is also heated sufficiently to produce additional radiant heat. Having returned within the confines of the perforated screen 44, the hot gases are then exhausted from the chicken brooder unit 10 through the central opening 62 formed in canopy 60. Accordingly, the combustion gases supplied from the gas burner 20 in their path of travel make a double pass through the perforations 45 in screen 44—first, passing outwardly through the perforations in the lower portion of the screen and second, passing inwardly through the perforations in the upper portion of the screen—whereby the maximum amount of radiant heat energy is derived therefrom before the products of combustion are exhausted through the central opening 62 in canopy 60. The hollow compartment 71 formed by closing the ends of the baffle member 40 by wedge plate 42 and cover 46, respectively, may contain dead air or suitable insulation material to prevent this area from becoming overheated.

A primary characteristic of radiated heat is the even distribution of heat energy. Thus, the chicken brooder unit 10 provides radiant infra-red heat which is evenly distributed in a circular band outwardly from the gas burner 20. The elevation of the superstructure or housing 13 of the brooder unit 10 from the floor of the chicken house H allows the chicks substantially complete freedom of movement about the heated area which aids in the healthy development of the chicks. Adequate ventilation is therefore assured through the use of such a brooder construction, it being known that ventilation is of prime importance in holding down chick mortality. Additionally, the elevation of the gas burner 20 above the chicks results in the air drafts created by the air intake of the burner through the apertures 27 in the bottom wall of the burner housing 26 being raised above the chicks, thereby preventing a drafty condition along the floor of the chicken house H and averting the inevitable chick sickness such a condition would cause.

Since the gas burner 20 is thermostatically controlled through the provision of a valve 34 in the main supply conduit 23 regulated by a thermostat 35, the operator can regulate the quantity of radiant heat produced by the brooder unit 10 by adjusting the thermostat 35, as desired. As a further aid in regulating the warmth provided by the brooder unit 10, the superstructure 13 of the brooder unit 10 can be vertically adjusted relative to the floor of the chicken house H by raising or lowering the rod 16 in the tubular socket member 15 or the standard 12.

Thus, it will be seen that there has been disclosed a gas-fired chicken brooder unit 10 which transforms convective heat supplied by the heated gases from the gas burner 20 into radiant heat energy in the infra-red range with maximum efficiency, the shape of the radiant heater element or screen 44 being such as to direct a major portion of the radiant heat downwardly in a circular band on the backs of the chicks below. It is apparent that the chicken brooder unit 10 herein described is susceptible of use with baby turkeys or other fowls, as well as with chicks.

In the drawings and specification there has been set forth a preferred embodiment of the invention and, although specific terms are employed, they are used in a generic and descriptive sense only and not for purposes of limitation, the scope of the invention being defined in the claims.

I claim:

1. In a radiant heating device for use as a chicken brooder or the like, an upright standard, a gas burner mounted atop the standard, a housing surrounding said gas burner, said housing comprising an outer screen having a plurality of perforations therein, baffle means within said screen for directing hot gases from said gas burner through the perforations in said screen to produce a red glow thereon, and a reflector positioned above said screen, said screen when heated sufficiently to produce a red glow thereon serving as a source of radiant infra-red heat, and said reflector directing stray radiant heat from said screen downwardly.

2. In a radiant heating device for use as a chicken brooder or the like, an upright standard, a gas burner for supplying heat mounted atop the standard, a housing surrounding said burner, said housing comprising an outer inverted frusto-conical screen having a plurality of perforations therein, an inverted frusto-conical baffle member within said screen, the larger upper end of said baffle member being secured to said screen and the smaller lower end being spaced therefrom to define an annular pocket for trapping hot combustion gases supplied from said burner between said screen and said baffle member to force the hot gases through the perforations in said screen, thereby producing a red glow thereon, and a reflector positioned above said screen, said screen when heated sufficiently to produce a red glow thereon serving as a source of downwardlly directed radiant infra-red heat, and said reflector directing stray radiant heat from said screen downwardly.

3. In a radiant heating device for use as a chicken brooder or the like, an upright standard, a gas burner for supplying heat mounted atop the standard, a housing surrounding said burner, said housing comprising an outer inverted frusto-conical screen having a plurality of perforations therein, baffle means within said screen for directing hot gases from said burner through the perforations in said screen to produce a red glow thereon, and a reflector positioned above said screen, said screen when heated sufficiently to produce a red glow thereon serving as a source of downwardly directed radiant infra-red heat, and said reflector directing stray radiant heat from said screen downwardly.

4. A radiant heating device for use as a chicken brooder or the like comprising a canopy having a central portion and an outer downwardly extending conical portion integral with said central portion, a gas burner having a circular burner head provided with circumferentially arranged radially outwardly directed nozzles, a source of gaseous fuel communicating with said nozzles for providing heat upon combustion of the gaseous fuel as it passes outwardly from said nozzles, means supporting said burner beneath the central portion of said canopy, baffle means secured to the top of said burner head for directing hot gases substantially outwardly from said burner head, a screen having a plurality of perforations therein surrounding said baffle means and said burner, the hot gases being adapted to be passed through the perforations in said screen to produce a red glow thereon, said screen thereby serving as a source of radiant infra-red heat, and the lower surface of the outer conical portion of said canopy being a reflector to direct stray radiant heat from said screen downwardly.

5. A radiant heating device for use as a chicken brooder or the like comprising a canopy having a central portion provided with a vent therein and an outer downwardly extending conical portion integral with said central portion, a gas burner having a circular burner head provided with circumferentially arranged radially outwardly directed nozzles, a source of gaseous fuel communicating with said nozzles for providing heat upon combustion of the gaseous fuel as it passes outwardly from said nozzles, means supporting said burner beneath the central portion of said canopy, an outer screen having a plurality of perforations therein surrounding said burner head, baffle means secured to the top of said burner head and to a medial portion of said screen and cooperating with said screen to define an annular pocket for trapping hot gases from said burner between said screen and said baffle means to force the hot gases through the perforations in said screen, thereby producing a red glow thereon, said screen serving as a source of radiant infra-red heat, and the lower surface of the outer conical portion of said canopy being a reflector to direct stray radiant heat from said screen downwardly, the hot gases upon being passed through the perforations in said screen being adapted to be exhausted through the vent in the central portion of said canopy by being drawn through the perforations in said screen above said baffle means.

6. A radiant heating device for use as a chicken brooder or the like comprising a canopy having a central portion provided with a vent therein and an outer downwardly extending conical portion integral with said central portion, a gas burner having a circular burner head provided with circumferentially arranged radially outwardly directed nozzles, a source of gas communicating with said nozzles for providing heat upon combustion of the gas as it passes outwardly from said nozzles, temperature-responsive means controlling the supply of gas to said burner nozzles for regulating the quantity of heat produced by said burner, means supporting the central portion of said canopy above said gas burner, said supporting means comprising an inverted frusto-conical impervious shield secured at its lower end to the top of said burner head and spaced from the central portion of said canopy and an outer inverted frusto-conical screen surrounding said burner and said shield, said screen being secured intermediate its ends to the upper end of said shield and said canopy resting upon the upper end of said screen, said screen having a plurality of perforations therein and cooperating with said shield to define an annular pocket for trapping hot combustion gases from said burner to force the hot gases through the perforations in said screen below its securement to said shield, thereby producing a red glow on said screen which serves as a source of radiant infra-red heat, and the lower surface of the outer conical portion of said canopy being a reflector to direct stray radiant heat from said screen downwardly, the hot gases upon passing through the perforations in said screen being adapted to be exhausted through the vent in the central portion of said canopy by being drawn through the perforations in said screen above said shield.

7. In a radiant heating device, a gas burner, a housing surrounding said gas burner, said housing comprising an outer screen having a plurality of perforations therein, baffle means within said screen for directing hot gases from said gas burner through the perforations in said screen to produce a red glow thereon, and a reflector positioned above said screen, said screen when heated sufficiently to produce a red glow thereon serving as a source of radiant infra-red heat, and said reflector directing stray radiant heat from said screen downwardly.

8. In a radiant heating device, a gas burner, a housing surrounding said gas burner, said housing comprising an outer inverted frusto-conical screen having a plurality of perforations therein, an inverted frusto-conical baffle member within said screen, the larger upper end of said baffle member being secured to said screen and the smaller lower end being spaced therefrom to define an annular pocket for trapping hot combustion gases supplied from said burner between said screen and said baffle member to force the hot gases through the perforations in said screen to produce a red glow thereon providing a source of radiant infra-red heat.

References Cited in the file of this patent
UNITED STATES PATENTS

| | | |
|---|---|---|
| 1,475,450 | Schneider | Nov. 27, 1923 |
| 1,506,964 | Antrim | Sept. 2, 1924 |
| 2,051,213 | Hamilton | Aug. 18, 1936 |
| 2,130,086 | Hart | Sept. 13, 1938 |
| 2,240,571 | Olson et al. | May 6, 1941 |
| 2,361,097 | Hess | Oct. 24, 1944 |